US007246327B2

(12) United States Patent
Iyer

(10) Patent No.: US 7,246,327 B2
(45) Date of Patent: Jul. 17, 2007

(54) INTERACTIVE, MENU-DRIVEN INTERFACE TO DATABASE

(75) Inventor: Gopal N. Iyer, Boca Raton, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 529 days.

(21) Appl. No.: 09/925,991

(22) Filed: Aug. 9, 2001

(65) Prior Publication Data

US 2003/0030676 A1   Feb. 13, 2003

(51) Int. Cl.
*G06F 17/00* (2006.01)
*G06F 17/30* (2006.01)
*G06F 15/16* (2006.01)

(52) U.S. Cl. ............... 715/780; 715/815; 715/968; 707/10; 709/225; 709/229

(58) Field of Classification Search ............... 345/810, 345/968; 707/10; 715/810, 968, 815, 780; 709/217, 225, 229
See application file for complete search history.

(56) References Cited

U.S. PATENT DOCUMENTS

| | | | | |
|---|---|---|---|---|
| 5,108,533 A | * | 4/1992 | Long et al. | 156/294 |
| 5,577,112 A | * | 11/1996 | Cambray et al. | 379/265.03 |
| 5,884,103 A | * | 3/1999 | Terho et al. | 710/62 |
| 5,920,725 A | * | 7/1999 | Ma et al. | 717/171 |
| 6,108,533 A | * | 8/2000 | Brohoff | 455/414.3 |
| 6,144,859 A | * | 11/2000 | LaDue | 455/511 |
| 6,199,099 B1 | * | 3/2001 | Gershman et al. | 709/203 |
| 6,243,611 B1 | * | 6/2001 | Hazama et al. | 700/97 |
| 6,259,907 B1 | * | 7/2001 | Bellamy et al. | 455/410 |
| 6,381,644 B2 | * | 4/2002 | Munguia et al. | 709/225 |
| 6,463,289 B1 | * | 10/2002 | Havinis et al. | 455/456.4 |
| 6,643,333 B1 | * | 11/2003 | Jung et al. | 375/295 |
| 6,859,649 B1 | * | 2/2005 | Denenberg et al. | 455/406 |
| 2002/0038349 A1 | * | 3/2002 | Perla et al. | 709/217 |

* cited by examiner

*Primary Examiner*—Weilun Lo
*Assistant Examiner*—Sara M Hanne
(74) *Attorney, Agent, or Firm*—Merchant & Gould, LLC

(57) ABSTRACT

An interactive, menu-driven interface to a cellular site information database is disclosed. The user may enter a form name such as channel, cell, trkgrp, trkmem, etc. into a form selection screen. The user may enter the operation desired to be performed on the form such as review, delete, insert, update, etc. to choose which form to view. After the user has entered the form name and the operation desired into the interface, the entered form is displayed to the user. A query, such as a SQL query, is issued to populate the fields of the form displayed on the interface with data from the database. The user may select one or more of the fields in the form and make revisions, addition, edits, etc. The user may then select the action command such as insert, review, update or delete. Commands, such as SQL commands, are generated to perform the action desired by the user on the database.

18 Claims, 7 Drawing Sheets

INTERACTIVE, MENU-DRIVEN INTERFACE TO DATABASE

TECHNICAL FIELD

This invention generally relates to cellular communications. More particularly, the present invention relates to an interactive, menu-driven interface to cell site information in a database.

BACKGROUND OF THE INVENTION

With the increasing popularity of cellular phone communications, managing the data associated with calls to and from cellular phones has become increasingly complex. For example, one type of data that is managed is cell face transfer data. Cellular phone systems typically include a cell face (or antenna) mounted on an antenna tower receiving calls from cell phones. A cell face receives calls within an associated geographic coverage area called a cell. An antenna tower can have multiple cell faces oriented at different angles to handle calls originating from multiple directions around the antenna tower. A process is employed in order to choose a cell face that handles the call from each cell phone. The process of selecting and switching among cell faces involves the use of data that designates available cell faces. A neighbor list in the database specifies the neighboring cell faces to which the current call may be handed off to. Before handing a call to a neighboring cell face, signal strengths from all the neighboring cell faces are measured and the cell face with the strongest signal strength is designated for hand-off. For example, as a mobile call moves away from one cell face, the neighbor list is accessed to select another cell face that is closer to the call so that the call can be handed off to the closer cell face.

The neighbor list data and numerous other types of data (such as cell data, channel data, trunk group and member data, device data, etc.) may be stored in a database of a cellular network, such as one manufactured by Ericsson. Sometimes, this data is stored in different forms in the database. Making changes to data in one of these forms may be complex. For example, typically an operating system in the cellular network is used to access a command handler application. The command handler application accepts line commands and performs updates and revisions to the database based on these line commands.

One problem with these line commands is that they are not intuitive to a user because a user must be familiar with specific line commands in order to enter the correct line commands and make the proper updates and revisions. Another problem is that there is no interactive interface to make the changes to the data. Instead, the user must enter line commands.

SUMMARY OF THE INVENTION

Cellular site information is often stored in databases, such as a database manufactured by Ericsson. Updating this cellular site information is often difficult because specific line commands, or scripts, must be entered into a command handler application. Thus, one problem with updating cellular site information is that a specific knowledge of these line commands is necessary to make changes to the cellular site information databases. Another problem is that even if a user has knowledge of the required line commands, the user, when making multiple changes to the database, may make mistakes entering these line commands. Thus, the present invention, in one embodiment, provides an interactive menu-driven interface to the database to eliminate the need for knowledge of specific line commands and to reduce the number of errors made.

In one embodiment, the invention is an interactive, menu-driven interface to a cellular site information database. The user may enter a form name such as channel, cell, trkgrp, trkmem, etc. into a form selection screen. The user may enter the operation desired to be performed on the form such as review, delete, insert, update, etc. to choose which form to view. After the user has entered the form name and the operation desired into the interface, the entered form is displayed to the user. A query, such as a SQL query, is issued to populate the fields of the form displayed on the interface with data from the database. The user may select one or more of the fields in the form and make revisions, addition, edits, etc. The user may then select the action command such as insert, review, update or delete. Commands, such as SQL commands, are generated to perform the action desired by the user on the database.

In one embodiment, the invention is a computer-implemented method for providing an interactive, menu-driven interface to a cellular site information database comprising cell site data. A form name input is received from the user identifying the form data in the cellular site information database that the user wants to view or edit such as cell data, channel data, trunk group and member data, device data, etc. A blank form may then be displayed to the user including a key field. The user may then input a value into the key field identifying a particular cellular site that the user wants to view or edit. For example, the user may enter channel for the form name input and then enter G003A for the key field indicating that the user wants to view the channel data for cell site G003A.

Queries, such as SQL queries, may be generated to retrieve the data corresponding to the identified cell site from a cellular site information database. The queries are sent to the cellular site information database and the appropriate data, such as channel data, corresponding to the identified cell site from the cellular site information database is retrieved. The data is displayed to the user in an interactive, menu-driven interface. The user may make changes as necessary. When the user is finished making changes, commands, such as SQL commands, are generated and sent to the cellular site information database to make the appropriate changes to the data.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
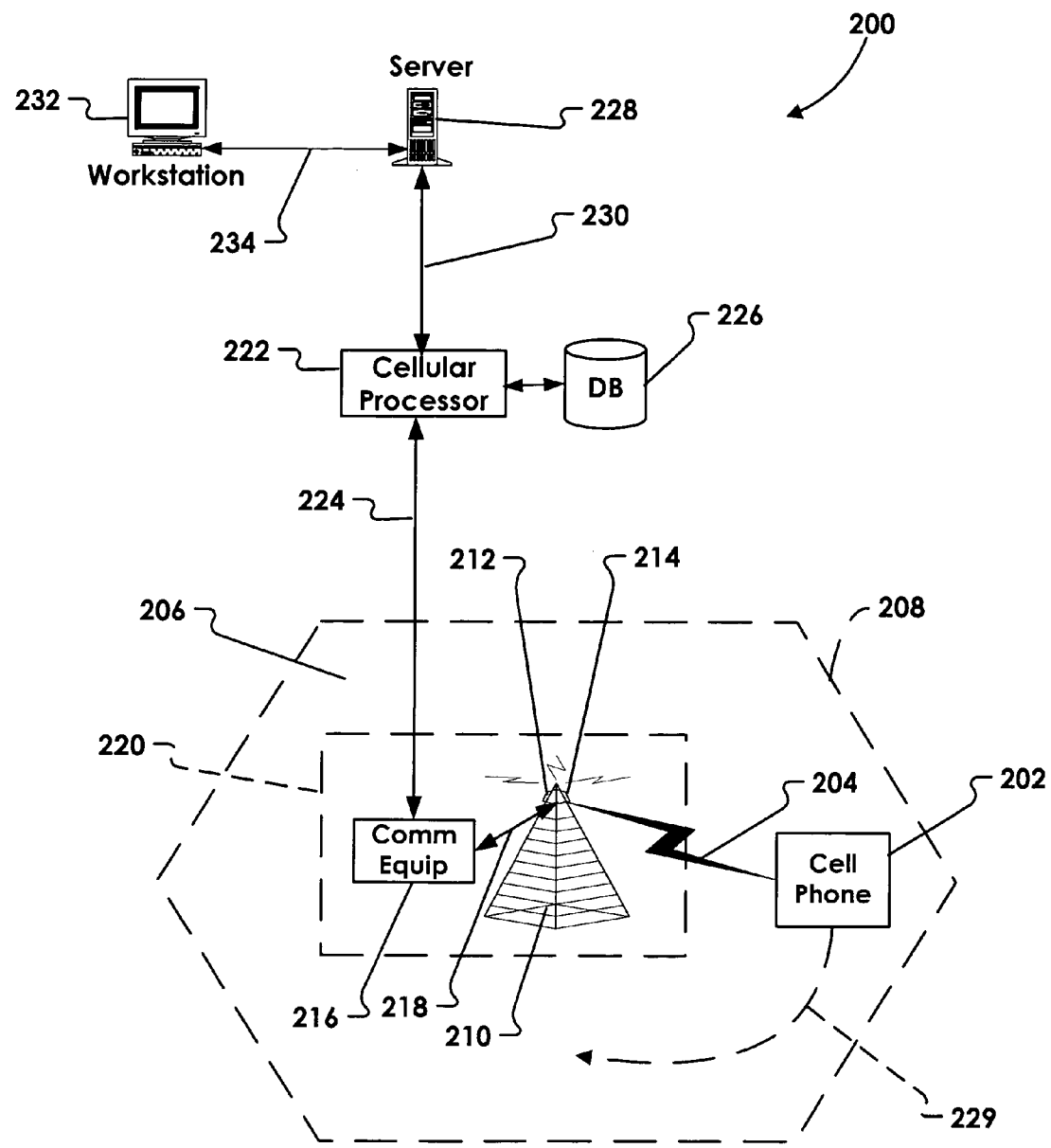
FIG. 1 is an exemplary cellular operating environment implementing an embodiment of the present invention.

In one embodiment, the present invention is an interactive, menu-driven interface for a cellular network database, such as a database manufactured by Ericsson. Currently, there is no interactive interface to modify forms in the Ericsson database. Instead, a user has to use a command handler application and enter one or more line commands (such as mtcgc:dev=mvdc-1001, vcg=vcge3 to change the value of the vcg field for device "mdvc 1001" to vcge3). In one embodiment, the present invention displays an interactive interface that supplies the user with a form requested by the user. The form may include a plurality of fields. The user may navigate an insertion point to different fields of the form, make changes to the fields as needed and then update the form without using line commands. Structured Query Language (SQL) commands may be generated to update the database.

In one embodiment, the invention is a computer-implemented method for providing an interactive, menu-driven interface to a cellular site information database comprising cell site data. A form name input is received from the user identifying the form data in the cellular site information database that the user wants to view or edit such as cell data, channel data, trunk group and member data, device data, etc. A blank form may then be displayed to the user including a key field. The user may then input a value into the key field identifying a particular cellular site that the user wants to view or edit. For example, the user may enter channel for the form name input and then enter G003A for the key field indicating that the user wants to view the channel data for cell site G003A.

Queries, such as SQL queries, may be generated to retrieve the data corresponding to the identified cell site from a cellular site information database. The queries are sent to the cellular site information database and the appropriate data, such as channel data, corresponding to the identified cell site from the cellular site information database is retrieved. The data is displayed to the user in an interactive, menu-driven interface. The user may make changes as necessary. When the user is finished making changes, commands, such as SQL commands, are generated and sent to the cellular site information database to make the appropriate changes to the data.

Having briefly described an embodiment of the present invention, an exemplary operating environment for the present invention is described below in reference to FIG. 1. Referring now to the drawings, in which like numerals represent like elements throughout the several figures, aspects of the present invention will be described.

FIG. 1 illustrates a suitable operating environment 200 utilizing an embodiment of the present invention. The environment 200 is generally a cellular telephone system for receiving and transmitting cellular phone calls. A cellular phone 202 is transmitting a signal 204 within a cell 206. The cell 206 is a geographic area generally defined by a boundary 208. The cell includes an antenna tower 210 that has transmitters and receivers for transmitting and receiving signals. The transmitters on the antenna tower 210 transmit at a designated power level. Likewise, the cell phone 202 transmits the signal 204 at a designated power level. The designated power levels of the antenna tower transmitters and the cell phone 202 dictate the location of the boundary 208 of the cell 206. Receivers on the antenna tower 210 will generally receive the signal 204 while the cell phone 202 is within the boundary 208 of the cell 206. Generally, when the cell phone 202 leaves the boundary 208 of the cell 206, the receiver of the antenna 210 will no longer receive the signal 204. In one embodiment, the cell boundary 208 is substantially hexagonal in shape.

A receiver on the antenna tower 210 is generally referred to as a cell face. The antenna tower 210 may have more than one cell face, such as a cell face 212 and cell face 214. A typical antenna tower has three cell faces, but the number of cell faces can vary. Each cell face on the antenna tower 210 is positioned so that it covers an area within the cell 206. Depending on the positioning and the orientation of the cell face 214, the cell face 214 will receive calls coming from a particular direction. The cell face 212 is oriented in a different position to receive calls coming from a different direction with respect to the antenna tower 210. A variety of cell face configurations are known in the art. For example, one cell face configuration is known as the omni face, which comprises a single cell face with a coverage area of 360 degrees around the antenna tower. A common cell face configuration includes three cell faces with each cell face having a coverage area of 120 degrees around the antenna tower. Typically a structure 216 is located near the antenna tower that houses communications equipment, such as radio transmitters, radio receivers, and power supplies. The communications equipment is connected to transmitters and cell faces on the antenna tower via a communications link 218. The structure 216 and the antenna tower 210 are commonly referred to as a base station 220. The base station 220 is located substantially in the middle of the cell 206.

Each cell face on the antenna tower 210 has an associated transmitter. Transmitters transmit control signals on unique control channels or frequencies that are used to send control messages to the cell phone 202. When the cell phone 202 is in operation, the cell phone 202 searches for the strongest control signal coming from the antenna tower 210. The receiver in the cell phone 202 locks on to the strongest control channel and begins receiving control information. The control information includes the transmission frequency at which the cell phone 202 should transmit. In the exemplary environment 200, when the cell phone 202 begins operation, it receives the strongest control signal from a transmitter associated with the cell face 214. Thus, as depicted in FIG. 1, the signal 204 from the cell phone 202 is being received by the cell face 214. The cell phone 202 may transmit using any of a number of communications protocols known in the art. The signal 204 will follow the protocol used by the cell phone 202. For example, the cell phone 202 may utilize an analog protocol known as Advanced Mobile Phone System (AMPS). Alternatively, the cell phone 202 may use a digital protocol, such as Time Division Multiple Access (TDMA).

The communications equipment 216 receives the signal 204 and may demodulate the signal. The communications equipment 216 typically is operable to receive signals in a variety of formats, including AMPS and TDMA. The signal 204 is sent to a cellular processor 222 via a communications link 224. The cellular processor 222 is typically a sophisticated computing device operable to manage cellular communications at the antenna tower 210. For example, the cellular processor 222 can monitor the signal strength of the signal 204. Also, the cellular processor 222 can detect when the cell phone 202 has been disconnected to terminate the call 204. The cellular processor 222 may also facilitate billing and locating the cell phone 202. One example of a cellular processor known in the art is the Executive Cellular Processor (ECP) manufactured by Lucent. Many other cellular processors are known in the art. The cellular processor 222 utilizes a database 226 to perform its functions. One particular function that the cellular processor 222 performs is determining which of the cell faces on the antenna tower 210 should optimally be used to receive the signal 204.

When the cell phone initially places a call 204, the cell phone 204 may be located in the coverage area of the cell face 214. Thus, the cell face 214 may have been optimal at the beginning of the conversation. However, the user of the cell phone 202 may be moving while the conversation is taking place. While the cell phone 202 moves in a direction 229, the signal strength of the signal 204 will vary with respect to the cell faces 212 and 214. The cellular processor 222 detects the variation in signal strength of the signal 204. As the cell phone 202 moves in the direction 229, it moves away from the cell face 214 and closer to the cell face 212. The cellular processor 222 detects a decrease in the signal power received by the cell face 214. Eventually, as the cell phone 202 continues to move, signal power received by the cell face 214 will be less than a minimum required level. In response, the cellular processor 222 accesses the database (in particular a neighbor list) 226 to determine which cell face the signal 204 can be transferred to.

The cellular processor 222 accesses the neighbor list in the database 226. The neighbor list is generally a list of cell faces to which a signal may be transferred or handed off. For example, the database 226 has a neighbor list associated with the cell face 214. The neighbor list for cell face 214 provides a list of available cell faces where the signal 204 can be transferred. In the example shown in FIG. 1, the cell face 212 is among the available cell faces given in the cell face transfer data for the cell face 214. After the cellular processor 222 identifies the cell face 212 as the optimal cell face, the cellular processor 222 sends a message to the communications equipment 216 indicating that the cell phone 202 should begin transmitting at a frequency associated with the cell face 212. In response to a message from the cellular processor 222, the transmitter for the cell face 214 transmits a control signal to the cell phone 202 that instructs the cell phone to switch to a frequency associated with the cell face 212. The process of transferring the cell phone signal 204 from the cell face 214 to the cell face 212 is extremely fast. There is no break in the conversation recognizable by the user of the cell phone 202. The process of transferring a signal from one cell face to another is referred to as handing off the call.

Oftentimes, updates to the database 226 are necessary. In order to update database 226, an embodiment of the present invention is running on a server 228 that is in communication with the cellular processor via a communication link 230. The server preferably includes an update system that is accessible by a workstation 232 connected to the server via a communication link 234. A user of the workstation 232 can access the update system running on the server 228 to facilitate updating of database forms. The forms may include the neighbor list. However, the forms may also include other types of cell site information data such as cell data, channel data, trunk group and member data, device data, etc.

Figure 2:
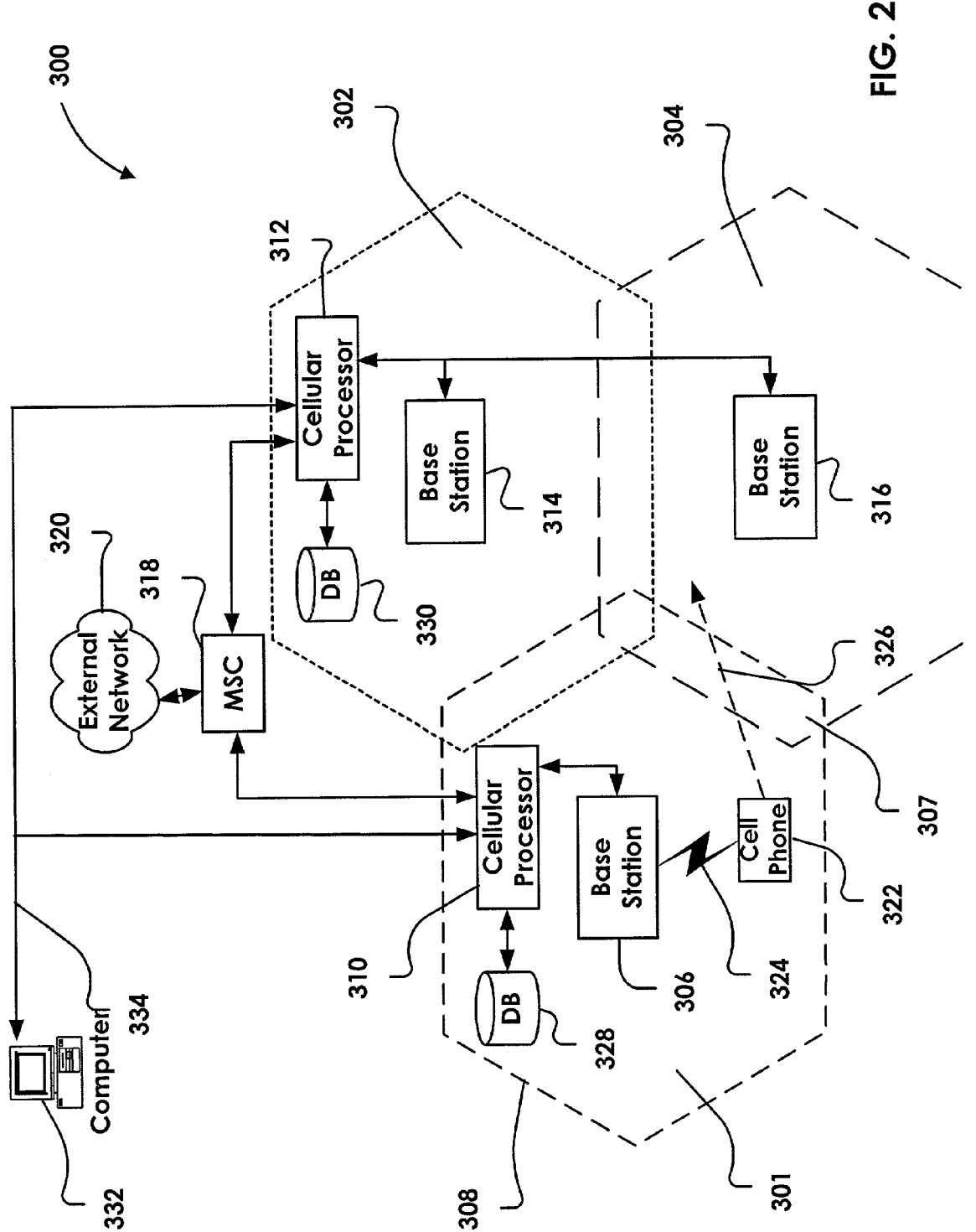
FIG. 2 is a multiple cell operating environment implementing an embodiment of the present invention.

FIG. 2 illustrates an exemplary multiple cell operating environment 300 implementing an embodiment of the present invention. The environment can include one or more cells, such as cell 301, cell 302, cell 304. Cells are often referred to as sites. Typically, each cell has an associated cell identification number used to identify the cell. Each cell has a base station, such as base station 306. The cell 302 has a base station 314 and cell 304 has a base station 316. Like the base station 220 of FIG. 1, the base stations 306, 314, and 316 each include radio equipment and an antenna tower having one or more cell faces. Cells 301, 302 and 304 may, but do not necessarily, overlap, as shown by an overlapping region 307. In one embodiment, the cell 301 has a coverage area defined by a substantially hexagonal boundary 308. During operation, a cellular processor 310 communicates with the base station 306 to monitor calls within the cell 301. Another cellular processor 312 communicates with the base station 314 and the base station 316 to monitor calls within cell 302 and cell 304 respectively. A typical cellular processor may be associated with 100 or more cells and base stations. The environment illustrated in FIG. 2 is exemplary only and the systems and methods described can generally be applied to environments including hundreds of cells.

As has been discussed, cellular processors, such as cellular processor 310 and cellular processor 312 typically monitor various data about cellular phone calls, such as signal strength, cell phone location, and billing. The cellular processors 310 and 312 also transmit signals to a mobile switching center (MSC) 318. The MSC 318 relays cell phone signals to an external network 320, such as a telephone wireline network. The MSC 318 is a sophisticated system that is in communication with networks and switches around the world to determine an optimal route for cell phone calls to reach their destination.

In the exemplary environment 300, a mobile communication device, such as a cell phone 322, is shown in the cell 301 transmitting a signal 324 to the base station 306. The signal 324 transmits voice data over a voice channel to a cell face at the base station 306. The base station 306 receives the signal 324 and transmits it to the cellular processor 310 so that the cellular processor 310 can monitor the signal 324. The cellular processor 310 may also transmit the signal 324 to the MSC 318, which may route the signal to the external network 320. The cell phone 322 may utilize any communications technology known in the art and the signal 324 may follow any protocol known in the art. Communications technologies include, but are not limited to, Code Division Multiple Access (CDMA), Advanced Mobile Phone System (AMPS), Global System for Mobile Communications (GSM), and Time Division Multiple Access (TDMA). Preferably, the base station 306 is operable to receive any or all of the possible communications technologies. The base station is configured to each technology—the radios are either analog or digital. An analog radio cannot handle digital calls. If the radio is a TDMA radio, it will not be able to handle GSM or CDMA calls.

As shown in FIG. 2, the cell phone 322 is traveling in a direction 326. The cell phone 322 is moving in the cell 301 toward the cell 304. As the cell phone 322 travels, it maintains communications with the base station 306 and the cellular processor 310 monitors the strength of the signal 324. As the cell phone 322 moves farther from the base station 306, the cellular processor 310 may detect that the strength of the signal 324 diminishes or weakens. The cell phone 307 travels through the overlapping region 307 where cell 304 and cell 301 overlap. When the signal strength of the signal 324 drops below a minimum power level, the cellular processor 310 accesses a neighbor list in a database 328 to determine an available cell face for a hand off. The database 328 contains a plurality of neighbor lists. Each neighbor list is associated with a cell face at a cell. Preferably each neighbor list has a cell identifier and a cell face identifier for the associated cell face. The cellular processor 310 reads cell face transfer data entries from the neighbor list that identify an available transfer cell face for a hand off. Handing off a call generally means transferring the call from one cell face to another cell face.

Cell face transfer data may be updated when a new cell such as cell 304 is implemented. For example, cell 304 and its associated base station 316 may be put into service after the cells 301 and 302 are operating. When the base station 316 is put into service, a plurality of new cell faces associated with base station 316 are made available to offer mobile communication service that was not existent prior to implementation of cell 304. As a result of the implementation of cell 304, data in the databases 328 and 330 may be updated to reflect the addition of cell 304. As an example, a call in cell 301 traveling into cell 304 may be handed off to a cell face of the base station 316. The cellular processor 310 will monitor the mobile telephone user's call for various parameters including signal strength. As the traveler travels from the cell 301 toward the cell 304, the signal strength from the call may diminish. The cellular processor 310 will send a signal to the base station 306 to initiate a hand-off to transfer the call to a cell face of the base station 316. The cellular processor 310 accesses the cell face transfer data stored in the database 328. The cellular processor 310 uses cell face transfer data in the database 328 to identify cell faces that are available for the call 324 to be handed-off.

Also shown in FIG. 2 is a computer 332 communicating with the cellular processor 310 and the cellular processor 312. The computer 332 implements an update system in accordance with an embodiment of the present invention. The update system can automatically update the database 328 and the database 330. The communications channel 334 can be any communications means known in the art. Examples of communications channels include, but are not limited to, Ethernet, telephone lines, or any proprietary communications protocol. A user of the computer 332 can select between the database 328 and the database 330, and access the database to update forms on the database.

Figure 3:
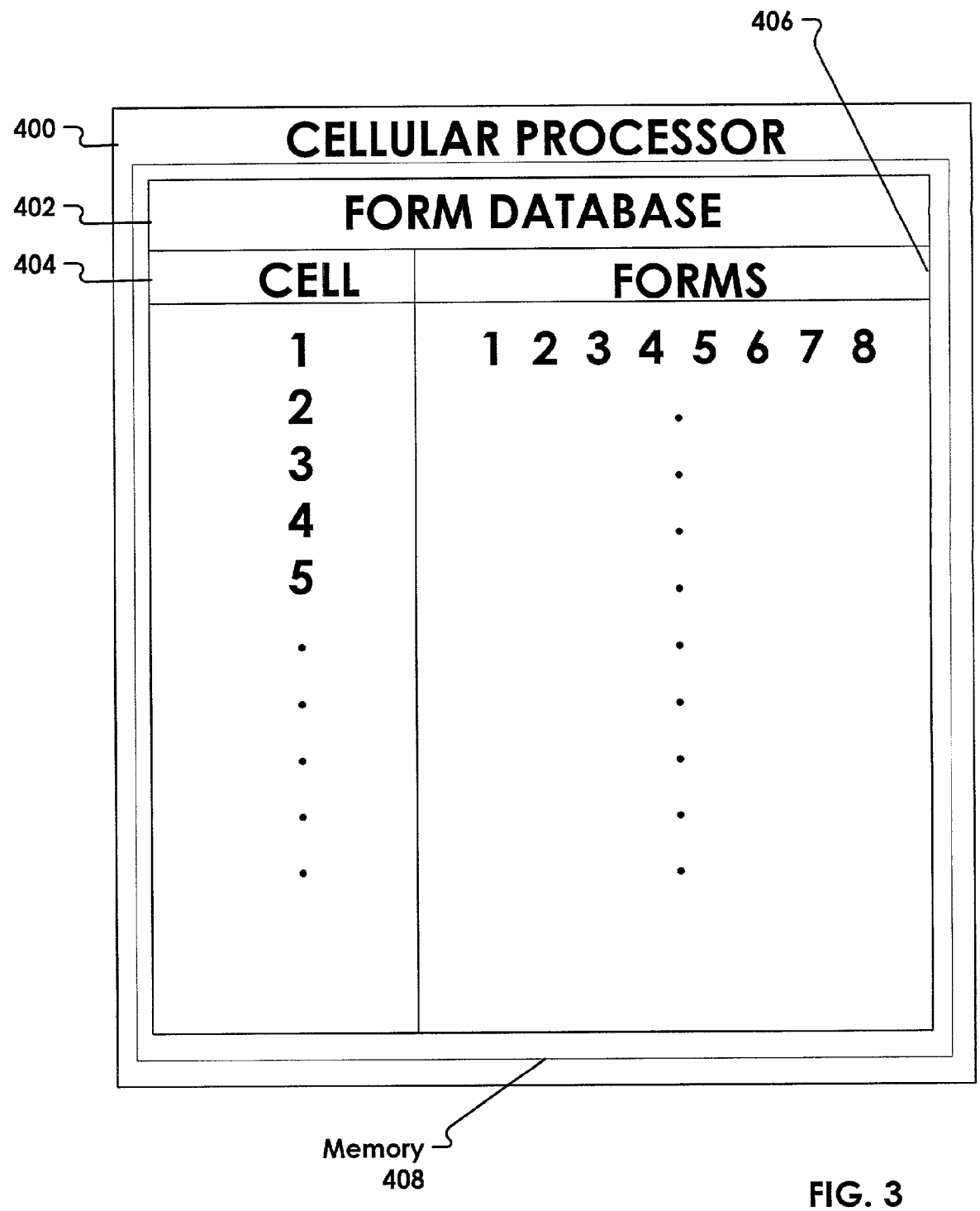
FIG. 3 is a diagram illustrating a cellular processor including a forms database.

FIG. 3 illustrates an exemplary cellular processor including a forms database including cell face transfer data and other types of data. A cellular processor 400 is depicted having memory 408 wherein database data is stored when accessed from a database (such as database 226, 328 or 330). Memory 408 can be any form of storage media known in the art, including, but not limited to random access memory (RAM), read only memory (ROM), electronically erasable programmable read only memory (EEPROM), or flash memory. Also, the form data base 402 can be stored on mass storage devices such as, but not limited to, hard drives, CD ROM, digital versatile discs (DVD), magnetic cassettes, PCMCIA card memory, or any other medium which can be used to store the desired information and which can be accessed by the cellular processor 400. In general, the form database 402 is a table of binary encoded data that is indexable by cell identification numbers 404. Each cell identification number 404 can identify a physical cell site. Each cell identification number 404 may also identify a cell face of a cell. For each cell identification number 404, a plurality of forms 406 exist in the form database 402. Each form holds a particular kind of data associated with a given cell identification number 404, and preferably can be viewed on a computer monitor. The forms may include information regarding a cell such as latitude/longitude of the cell, the ECP/MSC the cell is associated with, the status of the cell (equipped/unequipped), how many radios of each type the cell has, trunk groups associated with the cell, etc. Other forms are also stored in the database.

Figure 4:
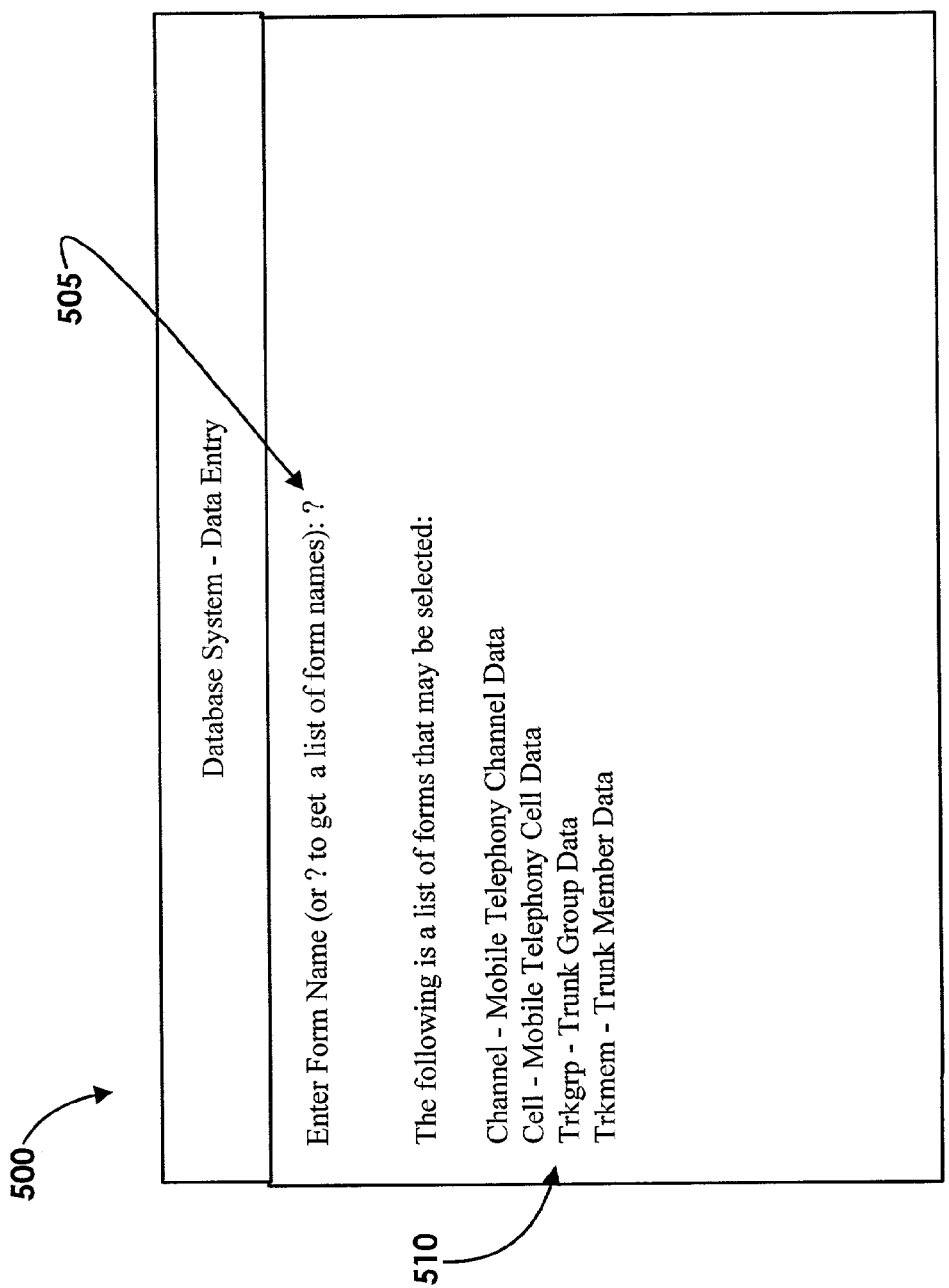
FIG. 4 is an illustration of a form selection screen in accordance with an embodiment of the present invention.

Referring now to FIG. 4, an interactive, menu-driven interface 500 in accordance with an embodiment of the present invention is illustrated. The interface 500 is an interface to a database. For example, the database may be a cellular site information database such as 226, 328, or 330. It should also be understood that, in a preferred embodiment, the database is a cellular site information database manufactured by Ericsson. In a preferred embodiment, an update application program that is running on server 228 and/or computer 332 displays the interface 500 on a monitor. In a preferred embodiment, the interface 500 is generated using Microsoft Visual Basic and is used to display a plurality of forms. A SQL query is issued by the update application program or a SQL server to populate the fields of the form displayed on the interface 500 with data from the database. The interface accepts input from the user to create, delete, and update data in the database. In response to the user input, the update application program generates SQL queries to perform the function desired by the user.

The interface 500 illustrated in FIG. 4 is a form selection screen which allows the user to select a form to view by entering a form name in form selection field 505. The user may enter a form name such as channel, cell, trkgrp, trkmem, etc. or may enter a question mark to display a list of form names. As illustrated in FIG. 4, the user has entered a question mark into the form selection field 505 and a list 510 of form names is displayed in the interface 500. The forms listed in FIG. 4 are exemplary only and are not meant to limit the invention to only those particular forms.

Figure 5:
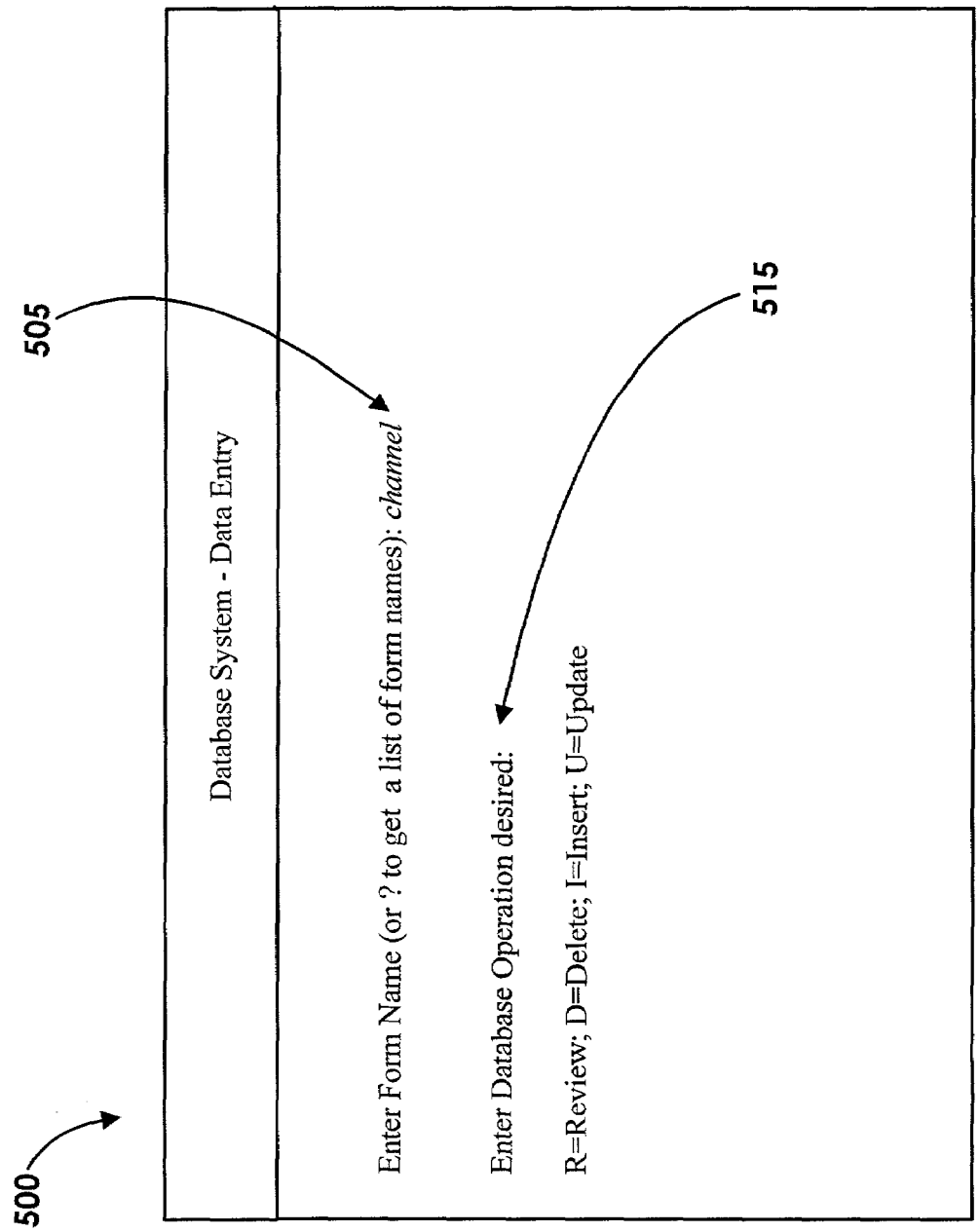
FIG. 5 is an illustration of a form selection screen in accordance with an embodiment of the present invention.

Referring now to FIG. 5, the interactive, menu-driven interface 500 in accordance with an embodiment of the present invention is illustrated. The interface 500 illustrated in FIG. 5 is the form selection screen through which the user may select a form name to display a form. As illustrated in FIG. 5, the user has entered the form name "channel" in the form selection field 505. The interface 500 also includes a database operation field 515 in which the user may enter the operation desired to be performed on the form such as review, delete, insert, update, etc. After the user has entered the form name and the operation desired into the interface, the entered form is displayed to the user as will be described below.

Figure 6:
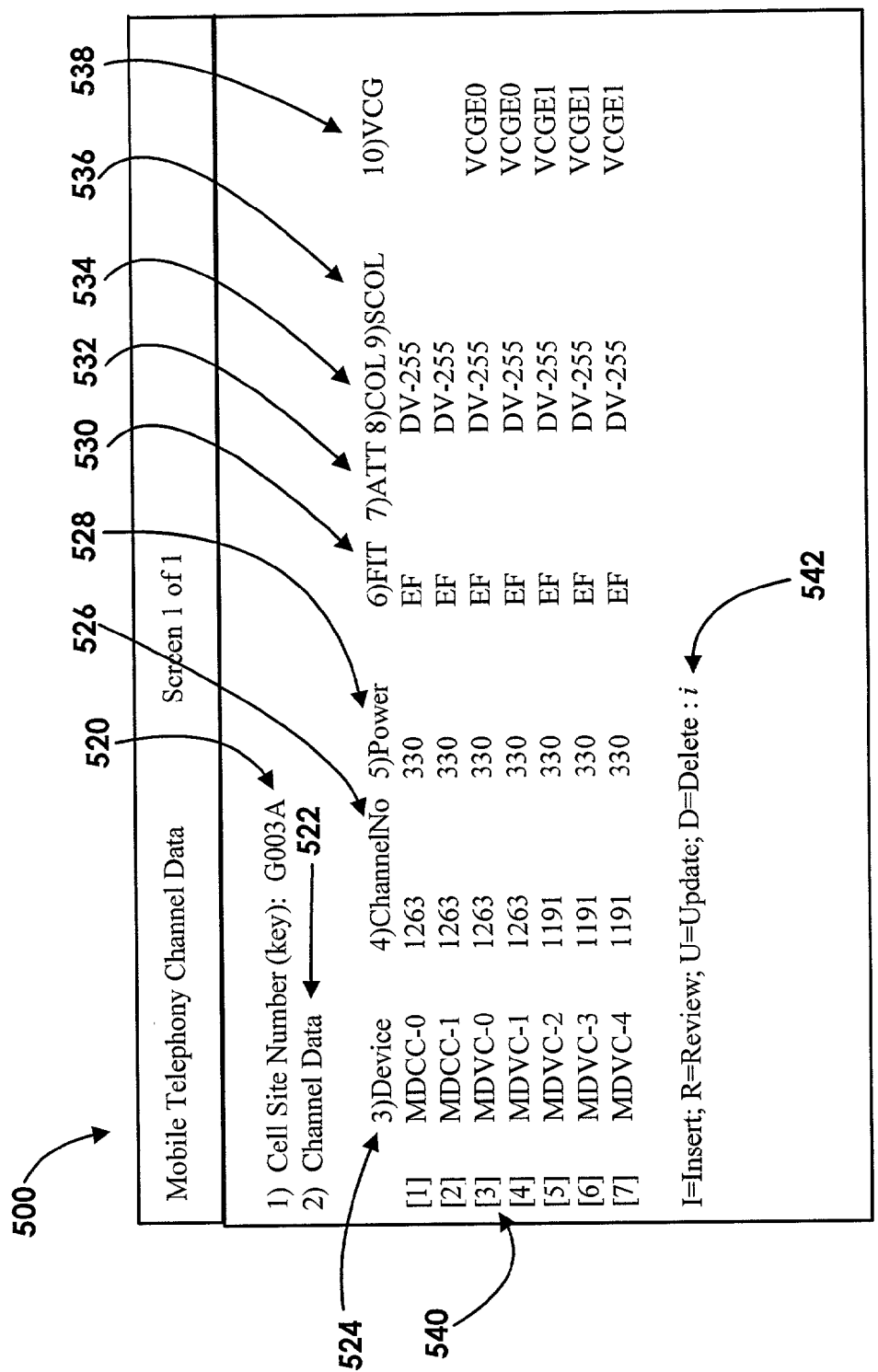
FIG. 6 is an illustration of the interactive, menu-driven interface displaying a channel form in accordance with an embodiment of the present invention.

Referring now to FIG. 6, the interactive, menu-driven interface 500 in accordance with an embodiment of the present invention is illustrated. The interface 500 illustrated in FIG. 6 displays a channel form through which the user may view and edit the channel data associated with a cell site such as cell site "G003A". Of course, the channel form is exemplary only as there are many different forms in the database that may be viewed and edited using different embodiments of the present invention. The channel form includes a cell site number (or key) field 520, a channel data field 522, a device column 524, a channel number column 526, a power column 528, a FIT column 530 (with values such as EF (Exact Fit), NA (Nearest Above), NB (Nearest Below)), an attenuation (ATT) column 532, a Color Code (COL) column 534, a Secondary Color Code (SCOL) column 536 and a Voice Channel Group (VCG) column 538.

The user selects one of these fields or columns by moving an insertion point, using the tab key on a keyboard, selecting a number corresponding to the field or column, or using another well-known selection technique. After the user selects one of the columns, the user selects one of the rows 540 and the user may make changes to the form. The user may then select the action command such as insert, review, update or delete. An insert command inserts a new record into the database; a delete command deletes an existing record from the database; a review command reads the database and populates fields in a form so that a user can review how the fields are populated; an update command modifies one or more fields.

Figure 7:
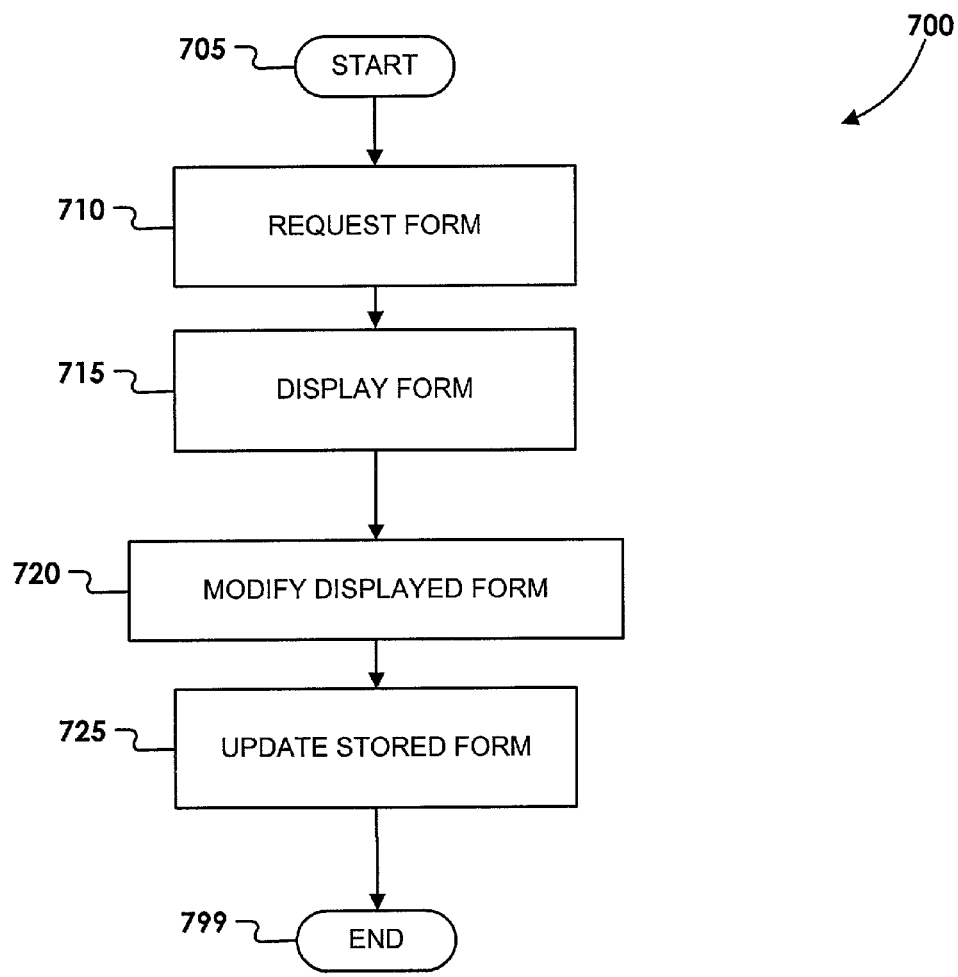
FIG. 7 is a flow diagram illustrating a method for updating a database form in accordance with an embodiment of the present invention.

Referring now to FIG. 7, a flow diagram illustrating a computer-implemented method for updating a database form in accordance with an embodiment of the present invention will be described. At start step 705, the method 700 begins and proceeds to step 710 when the user uses the interface to select a form for editing, such as by entering a form name. Typically, the user also selects an operation command such as insert, delete, review, update, etc. The method then proceeds to step 715 where the form is displayed to the user. To display the form, typically one or more SQL queries are generated and sent to the database so that the appropriate information may be retrieved and displayed.

At step 720, the user modifies the displayed form. Typically, the user will enter a key field 520 to select a specific form, the user will then select the field for editing (including the particular row and column), make changes and then selects again the command desired such as insert, review, update or delete.

For example, the user may first select the form and then the operation, such as insert/update/delete/review. In the case of update, the user will make the changes to one or more fields; then when he is finished with making changes, he will again type in "u" to proceed with the update. In the case of insert, the user will select the form and then the operation, namely, insert; he will enter values for all the fields in the form and will enter in "i" to insert the form. In the case of review, the user will select the form, and then the operation (review). Then he will give the key fields. The system will generate queries to get the data from the database and then will populate the form with values for the user to review.

At step 725, the form or display is updated according to the command selected by the user. One or more SQL queries may be generated and sent to the database to edit the database according to the user's changes.

The method then ends at step 799.

Although embodiments of the present invention have been described above using SQL commands to interact with the cell site information database, it should be understood that other languages well-known to those skilled in the art may also be used. Moreover, line commands may be automatically generated to interact with the cell site information database based on user input. For example, if the user edits a vcg field for a particular cell-site, the update application program module may automatically generate a line command, input the line command into a command handler application program (such as the Ericsson command handler application program running on the Ericsson OSS). The command handler application program module may then interact with the cell site information database based on the line commands.

It should be understood from the foregoing description that the present invention is user-friendly and easy to use. The present invention is faster than the current method of updating databases. Updates to databases can be done from the desktop with no need to log onto the Ericsson Operation Support System (OSS) and no need to enter line commands into the OSS. There is no need for special training to learn line commands to update databases.

It should be understood that in some embodiments of the invention, messages will be displayed to the user if there are any problems in the input data. For example, if the user is in Review mode and wants to review data for a cell number and he enters the cell number, but no record exist for the cell number that he entered—man error message will be displayed to the user. Another example is if a user is trying to update one or more fields and the update is successful, a message "Form Updated" will be shown on the screen. If the update is unsuccessful (a wrong value is entered for a field), an error message will be shown and the form won't be updated. In a preferred embodiment, the bottom 3 lines in the screen will be reserved for showing error messages and the top line will be reserved for showing updates—Form Updated/Form not updated/Retrieving form/Updating/Deleting, etc.

Although the present invention has been described above as implemented in a preferred embodiment, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for providing an interactive, menu-driven interface to a cellular site information database comprising cell site data, the method comprising:
   receiving a form name input corresponding to a type of cell site data stored in the cellular site information database associated with a plurality of forms, wherein the plurality of forms include a plurality of fields and wherein the form name input is chosen from one of the following: a control channel, cell, trunk group and trunk member, wherein the control channel carries a control signal including a cellular transmission frequency;
   in response to receiving the form name input, displaying on a display device one of the plurality of forms on which the type of cell site data corresponding to the received form name input is stored, wherein the plurality of fields of the displayed one of the plurality of forms are blank;
   after displaying the one of the plurality of forms on which the type of cell site data corresponding to the received form name input is stored, receiving a value in one of the plurality of blank fields, wherein the value corresponds to a cellular site;
   generating a plurality of queries to retrieve the type of cell site data corresponding to the form name input for the cellular site corresponding to the received value from the cellular site information database;
   sending the plurality of queries to the cellular site information database;
   receiving the type of cell site data corresponding to the form name input for the cellular site corresponding to the received value from the cellular site information database;
   displaying the type of cell site data corresponding to the form name input for the cellular site corresponding to the received value from the cellular site information database in the plurality of blank fields of the displayed one of the plurality of forms;
   receiving user input editing the data in at least one of the plurality of fields;
   generating commands corresponding to the user input to edit the data; and
   sending the commands to the cellular site information database to edit the data.

2. The method of claim 1 wherein the value corresponding to the cellular site is input by a user.

3. The method of claim 1 wherein the cellular site information database is database.

4. The method of claim 1 wherein the plurality of queries are SQL queries.

5. The method of claim 1 wherein the plurality of queries are a plurality of line commands that are executed by a command handler application which interfaces with the cellular site information database.

6. The method of claim 5 wherein the command handler application is operated in conjunction with a cellular site operating system.

7. The method of claim 6 wherein the cell site operating system is an Operation & Support System (OSS).

8. A computer-readable medium comprising computer-readable instructions which, when executed, are operable to perform the steps of claim 1.

9. The method of claim 1 wherein the commands are SQL commands.

10. A cellular site information database system, comprising:
 a database for maintaining a plurality of forms related to a cellular site, wherein the plurality of forms include a plurality of fields;
 a cellular processor connected to the database for accessing the plurality of forms stored in the database; and
 an update application program module in communication with the cellular processor, wherein the update application program module is operative to
  receive a form name input, wherein the form name input corresponds to a type of data stored in the cellular site information database associated with a plurality of forms, and wherein the form name input is chosen from one of the following: a control channel, cell, trunk group and trunk member, wherein the control channel carries a control signal including a cellular transmission frequency;
  in response to receiving the form name input, display on a display device one of the plurality of forms on which the type of data corresponding to the received form name input is stored, wherein the plurality of fields of the displayed one of the plurality of forms are blank;
  after displaying the one of the plurality of forms on which the type of data corresponding to the received form name input is stored, receive a value in one of the plurality of blank fields, wherein the value corresponds to the cellular site;
  generate a plurality of queries to retrieve the type of data corresponding to the form name input for the cellular site corresponding to the received value from the cellular site information database; and
  display the type of data corresponding to the form name input for the cellular site corresponding to the received value from the cellular site information database in the plurality of blank fields of the displayed one of the plurality of forms.

11. The cellular site information database system of claim 10, wherein the update application program module is further operative to transmit commands to the cellular processor.

12. The cellular site information database system of claim 11, wherein the commands are SQL commands.

13. The cellular site information database system of claim 12, wherein the SQL commands comprise an update command.

14. The cellular site information database system of claim 12, wherein the SQL commands comprise a review command.

15. The cellular site information database system of claim 12, wherein the SQL commands comprise an insert command.

16. The cellular site information database system of claim 12, wherein the SQL commands comprise a delete command.

17. A method for editing a cellular site information database, comprising:
 receiving a form name input corresponding to a type of data stored in the cellular site information database associated with a plurality of forms, wherein the plurality of forms include a plurality of fields and wherein the form name input is chosen from one of the following: a control channel, cell, trunk group and trunk member, wherein the control channel carries a control signal including a cellular transmission frequency;
 in response to receiving the form name input, displaying on a display device one of the plurality of forms on which the type of data corresponding to the received form name input is stored, wherein the plurality of fields of the displayed one of the plurality of forms are blank;
 after displaying the one of the plurality of forms on which the type of data corresponding to the received form name input is stored, receiving a value in one of the plurality of blank fields, wherein the value corresponds to a cellular site;
 generating a plurality of queries to retrieve the type of data corresponding to the form name input for the cellular site corresponding to the received value from the cellular site information database;
 receiving the type of data corresponding to the form name input for the cellular site corresponding to the received value from the cellular site information database;
 displaying the type data corresponding to the form name input for the cellular site corresponding to the received value from the cellular site information database in the plurality of blank fields of the displayed one of the plurality of forms;
 receiving an edited value for at least one of the plurality of fields of the displayed one of the plurality of forms;
 receiving a selection of an action command, wherein the action command corresponds to an operation to be performed on the displayed one of the plurality of forms;
 generating a plurality of editing commands corresponding to the selected action command to edit the at least one of the plurality of fields; and
 transmitting the plurality of editing commands to the cellular site information database.

18. The method of claim 17 wherein the plurality of editing commands are SQL commands.

* * * * *